United States Patent
Schilling

(10) Patent No.: US 6,996,300 B2
(45) Date of Patent: Feb. 7, 2006

(54) DEVICE FOR OPTICAL SIGNAL TRANSMISSION BETWEEN TWO UNITS MOVABLE RELATIVE TO EACH OTHER

(75) Inventor: Harry Schilling, Eichstätt (DE)

(73) Assignee: Schleifring und Apparatebau GmbH, Fürstenfeldbruck (DE)

( * ) Notice: Subject to any disclaimer, the term of this patent is extended or adjusted under 35 U.S.C. 154(b) by 0 days.

(21) Appl. No.: 10/996,187

(22) Filed: Nov. 22, 2004

(65) Prior Publication Data

US 2005/0129345 A1    Jun. 16, 2005

Related U.S. Application Data

(63) Continuation of application No. PCT/DE03/01536, filed on May 13, 2003.

(30) Foreign Application Priority Data

May 28, 2002   (DE) ................. 102 23 834
Aug. 28, 2002  (DE) ................. 102 40 228

(51) Int. Cl.
G02B 6/00 (2006.01)

(52) U.S. Cl. .............. 385/12; 385/37; 385/88; 385/122; 385/1

(58) Field of Classification Search ............... 385/12, 385/14, 39, 42, 43, 88, 92, 94, 122, 1, 37
See application file for complete search history.

(56) References Cited

U.S. PATENT DOCUMENTS

| | | | |
|---|---|---|---|
| 4,488,813 A * | 12/1984 | Kissinger et al. ........... 356/614 |
| 4,525,025 A | 6/1985 | Hohmann et al. ............ 385/25 |
| 4,577,184 A * | 3/1986 | Hodara et al. ............... 340/566 |
| 4,743,116 A * | 5/1988 | Udd et al. ................... 356/460 |
| 4,755,051 A * | 7/1988 | Cahill et al. ................ 356/460 |
| 4,808,813 A * | 2/1989 | Champetier ................. 356/338 |
| 4,822,127 A * | 4/1989 | Kamiya et al. .............. 385/46 |
| 5,241,184 A * | 8/1993 | Menzel .................... 250/458.1 |
| 5,297,225 A | 3/1994 | Snow et al. .................. 385/25 |
| 5,303,079 A | 4/1994 | Gnauck et al. ............. 359/188 |
| 5,483,161 A * | 1/1996 | Deeter et al. ............ 324/244.1 |
| 5,699,461 A * | 12/1997 | Minemoto et al. ............ 385/12 |
| 6,278,815 B1 | 8/2001 | Poisel ......................... 385/25 |
| 6,396,979 B1 * | 5/2002 | Freud et al. .................. 385/34 |
| 6,645,777 B1 * | 11/2003 | Letcher et al. .............. 436/526 |

FOREIGN PATENT DOCUMENTS

DE   196 25 870   1/1998   ............. 385/12 X
EP   0 819 969    1/1998   ............. 385/12 X

OTHER PUBLICATIONS

International Search Report, PCT/DE03/01536, mailed Oct. 17, 2003.

* cited by examiner

*Primary Examiner*—Brian M. Healy
(74) *Attorney, Agent, or Firm*—Kevin L. Daffer; Daffer McDaniel, LLP

(57) ABSTRACT

A device for transmitting information between at least two units mobile relative to each other comprises a light guide having a light-guiding medium, the optical properties of which can be changed by external electromagnetic fields. The light guided in this light guide is modulated by electromagnetic fields emitted by a movable probe.

15 Claims, 2 Drawing Sheets

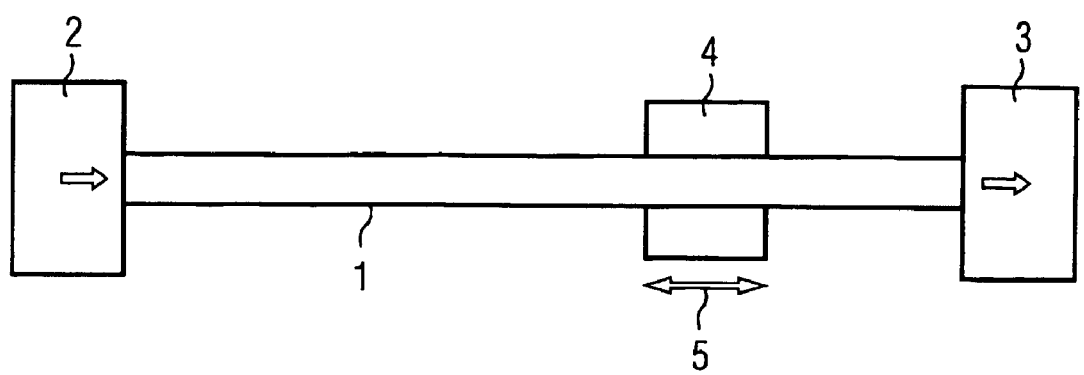
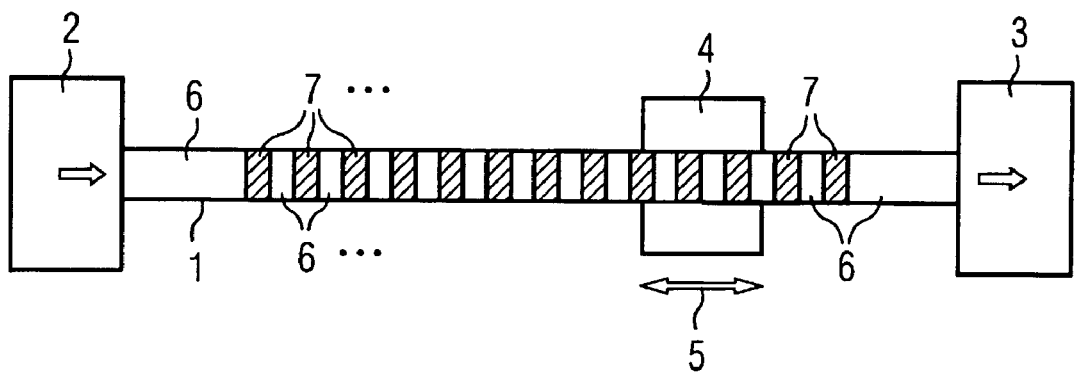

DEVICE FOR OPTICAL SIGNAL TRANSMISSION BETWEEN TWO UNITS MOVABLE RELATIVE TO EACH OTHER

CROSS REFERENCE TO RELATED APPLICATIONS

This application is a continuation of pending International Application PCT/DE03/01536 filed May 13, 2003, which designates the United States and claims priority from pending German Applications DE 102 23 834 filed May 28, 2002 and 102 40 228 filed 28 Aug. 2002.

BACKGROUND OF THE INVENTION

1. Field of the Invention

The invention relates to a device for transmitting information by means of light guides, in which a transmitter and/or a receiver are adapted to be moved or differently positioned along a light guide. Similarly, however, the transmitter and the receiver may be disposed at given fixed positions.

Devices of this kind having a linear configuration are employed for example in crane or other conveyor systems for data transmission between a movable crane and a stationary control unit. Another field of application of these data transmission systems having a circular configuration is that of transmission between parts that are rotatable relative to each other in a computer tomograph, for example, between a rotor supporting both an X-ray tube and a detector, and a stationary evaluation unit for processing and displaying image information. In stationary applications too, for example on optical circuit boards, various taps are needed along a given length. Optionally, these taps may be provided to be permanent or, for example, occupied by plug-in modules as instantly needed.

2. Description of the Prior Art

In prior art transmission systems based on light guides, light is coupled into a light guide at one end, and then passed through the light guide to the other end thereof, where it is evaluated by a suitable receiver. A multitude of different variants based on this are known, and make possible a simultaneous transmission of a plurality of wavelengths by means of filters, or even a transmission to a plurality of different sites, for example by means of Y couplers. However, systems of this kind are not suitable for coupling signals in or out laterally at any desired position along a light-guiding fiber. Various other techniques are known for this.

A device of this kind is described in the U.S. Pat. No. 5,297,225. In this, light which is coupled into the light-guiding medium from the outside through notches provided on the outside is deflected by reflection at such angles that it can be guided inside the medium. A transmission device of this kind may be used expediently when coupling-in is to be made at given fixed positions. Basically it may be used also for a transmission between movable units, because the light is coupled in or out without contact. However, if a long distance of movement is needed, as is the case with crane systems or even rotary transmission systems of large diameter, then a very high attenuation results from the many notches along the light-guiding medium. This makes extreme demands on the dynamic ratio of the receiver. A typical attenuation of this arrangement of about 10 dB per meter overtaxes conventional optical receivers at a track length of several meters. Therefore this transmission system can be put into practice for long transmission tracks only with optical components which are particularly expensive and require much outlay.

Alternatively, an example of a light guide also suitable for transmission is substantially formed by a trench having a mirror surface. A light guide of this kind is disclosed in U.S. Pat. No. 4,525,025.

The various principles of coupling light in or out involve a limited bandwidth, and are therefore hardly applicable for data rates in a Giga-baud range. If broadband light guides such as, for example, single-mode fibers are used, then the light to be coupled-in must be positioned with extreme accuracy, i.e. to within a range of micrometers. This is technically hardly feasible with systems moving rapidly with respect to each other, as in computer tomographs, where they at present move at a circumferential speed of up to 20 m/s. Even in slowly moving systems, a positioning which satisfies the usual demands of shock resistance and dynamic strength, as made on industrial and military systems, can be achieved only with extreme mechanical outlay.

If in a case of light being coupled into a light guide, attempts are made to illuminate the light guide using a beam of large cross-section, then very high transmitter power is needed for this. However, suitable high power building components, such as lasers, can usually be modulated only slowly. If in a case of a beam being coupled out, receiving diodes of large area are used, then owing to their large area here too a substantially smaller data rate is achieved.

In DE 196 25 870 A1 another optical transmission system is described in which the optical signal to be received can be coupled-in laterally by scattering. Here, in order to obtain a signal which at least can be evaluated, the light guide is designed to be an optical amplifier. It consists of a material having an electron arrangement which can be inverted by energetic excitation and which emits light by stimulated emission. In this, the stimulation is effected by light coupled in by scattering. This device requires a particularly large technical outlay. Thus, at least one pumped light source, usually a laser of high power, and also wavelength selective coupling elements for coupling-in the pumped light, and also for separating pumped light and emitted light, are needed. These additional components increase system costs of a transmission system of this kind so that it is not usable on a broad basis in industrial and medical applications.

The devices according to prior art require extremely precise focusing of the coupled-in light owing to the low efficiency of coupling-in, and thus make very high demands on the mechanical design of the entire arrangement. Apart from the mechanical problems, the known optical solutions are particularly sensitive to a contamination of the optical systems. If, for example, in the course of time the light guide becomes covered with a layer of carbon dust, for example from adjacent carbon brushes for electrical signal transmission, and also of oil and other impurities, then the attenuation of the transmission systems strongly increases.

Because the technical operating principles of rotary transmission and linear or curve-shaped transmission are the same, the following explanations will make no further distinction between them. The terms are used synonymously. Furthermore, no distinction will be made between components termed as light wave guides and light guides, because their functions are comparable as far as the invention is concerned, although light wave guides are preferably used in technical practice.

BRIEF SUMMARY OF THE INVENTION

The invention is based on the object of providing a broadband optical data transmission system which does not have the aforesaid disadvantages and, in particular, can be put into practice more economically, and which also is not sensitive to mechanical tolerances. Furthermore, the transmission system is to be substantially insensitive to contamination of the light guide.

In accordance with the invention, this object is achieved with a device for transmitting optical signals, comprising a light guide having at least one hollow body or parts of a hollow body with a reflecting inside surface for guiding light by reflection at the inside reflecting surface, or having at least one body of a transparent material, surrounded by at least one medium of a lower refractive index for guiding light by total reflection at a boundary surface between the body of the transparent material and the medium; an optical transmitter connected to at least one point of the light guide for feeding optical signals into the light guide; and an optical receiver connected for receiving optical signals to at least one point of the light guide at which signals from the optical transmitter can be received; wherein the light guide comprises at least one light-guiding medium located in an optical path between the transmitter and the receiver, the at least one light-guiding medium exhibiting at least one optical effect that can be changed by external electromagnetic fields or radiation; transmission characteristics of the medium and also of the light guide can be changed by means of the optical effect according to the external electromagnetic fields or radiation; at least one probe is disposed at a variable or a given position along a course of the light guide; and the at least one probe is designed to apply to the light guide at least one of electric fields, magnetic fields, electromagnetic fields, or radiation in accordance with information to be transmitted, so that the transmission characteristics of the light guide change in accordance with the information to be transmitted.

BRIEF DESCRIPTION OF THE DRAWINGS

In the following, the invention is described by exemplification, without limitation of the general inventive concept, on examples of embodiment with reference to the drawings.

FIG. 1 schematically shows in a general form a device according to the invention;

FIG. 2 schematically shows an embodiment of a device according to the invention;

LIST OF REFERENCE NUMERALS

Figure 3:
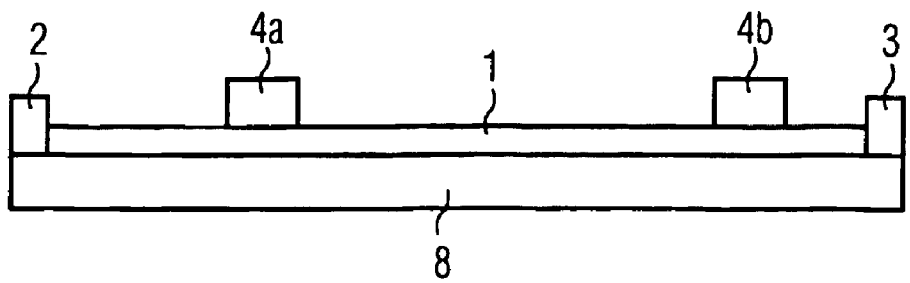
FIG. 3 shows a side view of a simple embodiment of an optical circuit board or an optical bus system as used for a device according to the invention.

| | |
|---|---|
| 1 | light guide |
| 2 | optical transmitter |
| 3 | optical receiver |
| 4 | probe |
| 5 | directional arrow |
| 6 | sections for guiding light |
| 7 | sections for modulation |
| 8 | support plate |

-continued

LIST OF REFERENCE NUMERALS

| | |
|---|---|
| 9 | filling material |
| 10 | first segment of the light guide |
| 11 | second segment of the light guide |
| 12 | combined transmitting and receiving unit |
| 13 | first terminal element |
| 14 | second terminal element |

DETAILED DESCRIPTION OF THE INVENTION

The transmission device in accordance with the invention comprises a light guide that is connected to an optical transmitter and an optical receiver, so that the receiver can receive the light emitted by the transmitter. The light guide may be, for example, a planar light guide, or a light-guiding fiber, for example a plastics fiber or glass fiber, or a hose filled with gas or liquid. In the case of light-guiding fibers, the transmitter is disposed preferably at the first end, and the receiver at the second end.

For transmitting information, the light guide comprises at least one light guiding medium in the region between the transmitter and the receiver, which exhibits at least one optical effect that can be changed by external electrical, magnetic or electromagnetic fields, or by radiation. This makes it possible for the light fed in from the transmitter to be changed or modulated by means of changes of the optical effect. Of course, in the case of a plurality of coupling-in positions a plurality of probes may be provided.

For coupling-in the electromagnetic fields or radiation, at least one probe is provided which is disposed at a variable or given position along the course of the light guide, and is designed to apply electromagnetic fields or radiation in accordance with the information to be transmitted, to the light guide.

The substantial difference of the device according to the invention from known prior art resides in the energy to be transmitted no longer being coupled into the light guide from the outside, and in the energy flow within the light guide being changed. This results in substantially simpler technical solutions. In prior art, a focusing of light of high energy density into a light guide of small diameter was necessary. Thus, the light had to be coupled-in at an exactly defined position, and within a narrow range of angles. Particularly with movable parts, this caused a high mechanical outlay for achieving a precise support, and was extremely sensitive to contamination. With the device according to the invention, an exact focusing is not necessary. Rather than this, it is sufficient to supply adequately high energy to the light guide so that it can change its properties accordingly. This can be effected, for example, by coupling in high frequency energy through conductors, coupling surfaces, inductances or optical radiation. Energy is supplied to the light guide in an advantageous manner not via a point-shaped, but a larger surface. With this also, a sensitivity to contamination is substantially reduced.

In the device according to the invention, optical transmitters or optical receivers are preferably arranged at different positions of the light guide. However, optionally they may be mounted at the same end of a light guide, in case a change of reflection occurs within the light guide because of the optical effect used for modulation, so that more or less light from the transmitter is reflected into the receiver. An arrangement at the same end is also expedient when the other end, or another end, of the light guide is provided with a mirror for reflection of the light. With some optical effects, a design of this kind brings with it even an amplification of the effect, because the light must pass the position of the probe twice or more often. However, this is not compatible with all optical effects, because a second passage through the light guide could cause neutralization of the effect.

In a particularly advantageous embodiment of the invention, the light guide comprises at least one light-guiding medium between the transmitter and the receiver, the medium exhibiting at least one non-linear optical effect that can be changed by external fields or radiation. Generally, non-linear optics comprises those optical phenomena in which not the first, but higher orders of the electrical and magnetic field strength dominate. A definition of the term can be found in Harry Paul: "Lexikon der Optik"; published by Spektrum akademischer Verlag GmbH, Heidelberg, Berlin; 1999, page 71.

Non-linear optical processes which are known at present and are suitable for modulation of light are:
  generation of harmonics
  generation of summed frequencies (up-conversion)
  generation of differential frequencies
  parametric fluorescence
  parametric amplification (a method also usable for an optical amplifier that can be modulated by electrical, magnetic or electromagnetic fields)
  parametric oscillation
  four-wave mixing
  self-focusing (a method also usable for light-beam focusing wherein focusing is effected without lenses, which is of particular advantage with high energy densities, as occur, for example, with lasers for material processing, or with laser diodes)
  photon absorption
  photon ionization
  photon emission
  optical rectification
  intensity-dependent refractive index
  induced change of refractive index
  coherent exchange effect
  coherent anti-Stokes Raman scattering
  stimulated Raman scattering
  stimulated Brillouin scattering
  phase modulation
  self-switching and induced switching (a method also applicable for an optical multiplexer and demultiplexer, or for variable optical circuitry with, for example, circuit boards)

With these processes it is possible to change the amplitude, phase, wavelength, or polarization of transmitted light according to an external electric, magnetic or electromagnetic field.

The above listed non-linear optical processes are supplemented by a series of optical effects which either are optically non-linear on their own, or arise from one or a plurality of the non-linear optical processes. Of course, there also are effects which are not derived from the non-linear optical processes, but nevertheless may be found useful for an application according to the invention.

The effects which are known at present and applicable in conformity with the object of the invention are:
  electro-absorption
  electro-reflection
  electro-optical effect (e.g. linear and quadratic electro-optical effect)
  magneto-optical effect
  photo-refractive effect
  effect of magnetic dichroism In accordance with the invention, a direct coupling-in of the light to be transmitted into the light guide is no longer necessary with any of the non-linear optical processes or the described effects. An indirect change is made of only the light within a closed ray path.

In the case of electrical or magnetic coupling-in, a highest insensitivity to contamination, such as with carbon dust, results.

Thus, basically all optical effects which cause a change of optical information in dependence upon the signal supplied by the probe can be applied. The change may be, for example, one of amplitudes, phases or even wavelengths. Suitable means which operate in an amplitude-selective, phase-selective or wavelength-selective manner should therefore be provided in front of, or together with, the receiver.

In another advantageous embodiment of the invention, the light guide comprises at least one light-guiding medium having properties which can be changed by external electric and/or magnetic fields. Accordingly, at least one probe is designed for applying electric and/or magnetic fields to the light guide. For applying electric fields, it may consist, for example, of two plates which enclose the light guide. Coils, for example, may be used for generating magnetic fields.

The transmission of information may be based on magneto-optic or electro-optic effects. Thus, the light-guiding medium may contain oxidic crystals doped with foreign atoms. In this way, for example, magnetic fields external to the probe can change the rotation of the polarization axis and alter the ellipticity of light upon reflection at the crystals by way of the magneto-optical Kerr effect. Similarly, by way of the Cotton-Mouton effect, the Voigt effect, or the Majorana effect, a linear double-refraction in a transparent medium under transverse magnetization can be caused or changed. Here as a medium, homogeneous, mainly organic, liquids in the case of the Cotton-Mouton effect, cobalt in the case of the Voigt effect, and colloidal solutions for the Majorana effect are preferred. By utilization of the Faraday effect, the plane of polarization is changed during a passage through a suitable material, such as benzene for example, in dependence upon an external magnetic field.

A signal transmission based on the electro-optical Kerr effect is also possible. Thus, by applying an external electric field, the optical double refraction of suitable materials, for example benzene, nitrobenzene, carbon disulfide or water, can be changed. Utilizing the Pockel effect, the doubly refracting properties of crystals may be varied by applying electric fields.

In the cases set out here, the evaluation may be effected for example by means of a polarization filter additionally placed in front of the receiver, so that the changes of polarization are converted to changes of amplification.

In order to effect a direct change of the amplitude, for example a field-dependent change of the absorption in semiconductor materials, the Franz-Keldysch effect may be utilized. In the same way, the Stark effect which occurs in hydrogen or certain semiconductors can be used for modulating the amplitudes.

In the same way, further non-linear effects which, for example, change the wavelength of a carried signal, or perform a mixing of two carried signals, in dependence upon external fields, can be utilized. The output signal, an optical signal with changed wavelength, can be evaluated by an optical superposition receiver, or by means of the flank of a wavelength-selective filter.

This listing is in no way exhaustive; being representative of a whole species of effects, it is merely intended to illustrate some of these effects, their consequences and their uses.

In another advantageous embodiment of the invention, the light guide comprises at least one light-guiding medium having optical properties which can be changed by external optical radiation. Accordingly, at least one probe is designed to apply optical radiation to the light guide. In advantageous manner, it has a light source adapted to be modulated, such as an LED, or a laser or a laser diode. Thus, for example, the double refraction of an isotropic medium, such as $CS_2$ for example, can be changed by radiation from a linearly polarized light source by way of the optical Kerr effect.

Another embodiment of the invention provides for the light guide to comprise at least one light-guiding medium having optical properties which can be effected in various ways and manner by various kinds of electromagnetic fields or radiation. Accordingly, at least one probe is designed to emit, and apply to the light guide, various kinds of electromagnetic fields or radiation. For this, a substantially better modulation of the signal can be achieved by superposing a plurality of non-linear effects. It is also possible to transmit a plurality of signals simultaneously by means of various kinds of modulation. Here it is particularly expedient to provide various materials which can be changed by various effects piece by piece along the course of the light guide. In this way, for example, effects causing a rotation of the polarization and an attenuation in dependence upon external fields can be combined with each other. Of even greater advantage would be a combination of at least one of these effects with another effect that changes the wavelength of the transmitted light. Here an evaluation by means of wavelength-selective filters is particularly easy. Similarly, basically it is possible to utilize a plurality of kinds of effects that change the wavelengths of the light in various manner. A corresponding evaluation is effected using various wavelength-selective receivers.

In another advantageous embodiment of the invention, the light guide comprises at least one light-guiding medium having optical properties that can be changed by electric and also magnetic fields in different ways and manner. Accordingly, at least one probe is designed for applying electric or magnetic fields to the light guide.

In a further advantageous embodiment of the invention, the light guide comprises at least one light-guiding medium having optical properties that can be changed by electric fields and also optical radiation. Accordingly, at least one probe is designed to emit electric fields and also optical radiation.

In another embodiment of the invention, the optical transmitter is designed to emit light at a plurality of wavelengths simultaneously. Furthermore, the light guide comprises at least one light-guiding medium having optical properties which can be changed in various ways based on different effects of non-linear optics. At least one probe is designed for separate excitation of various effects. The optical receiver is designed to receive the light wavelengths modulated by the various optical effects selectively. Thus, a plurality of signals can be selectively transmitted at the same time.

According to another advantageous embodiment of the invention, a receiver is used which receives a plurality of signals simultaneously, instead of the selective receiver of the previously mentioned case of embodiment. Owing to the simultaneous transmission of a plurality of signals, and to their modulation based on different optical effects, a transmission can be achieved that is particularly free from interference and is reliable. In addition, the volume received by the receiver is increased by the simultaneous transmission of a plurality of signals, and the signal-to-noise ratio is improved.

For this, the optical receiver is provided with means for splitting the received light into a plurality of different portions. These are then evaluated and preferably compared with each other. This is particularly expedient when different kinds of modulation of the light are caused by the modulation at the site of the probe, or by the subsequent guiding of the light in the light guide. Thus, for example, a modulation can be effected by simultaneously changing the spectral composition and also the polarization. If both effects are now evaluated together, then a greater signal can be obtained by addition. Alternatively, the quality of the signal and the correctness of the transmitted information can be checked by correlation.

Another embodiment of the invention provides for the light guide to comprise sections for guidance of light and also sections for modulation. With this, optical elements may be employed which are optimized for the respective purposes. Thus, a short section of the light guide, which is optimized for important transmission characteristics such as low attenuation and small dispersion, can be employed to guide the light. Alternating with this, a short section of a modulator can be provided which has been optimized with respect to its modulating properties. Optionally, different sections having different modulating properties (optical effects) may also be provided. By means of a construction in which these different sections are alternately disposed, better characteristics can be achieved owing to the optimization of respective sections for a respective purpose, than with a combined light guide that has been also designed for modulation. In order that no interruptions may occur, particularly with transmission from a movable probe, this probe should be dimensioned to be sufficiently large, so that it always communicates with at least one, or better two, sections for modulation.

Another advantageous embodiment of the invention provides an amplitude regulating loop for regulating the amplitude of the transmitted optical power of the optical transmitter so that optionally the optical signal level at the input of the optical receiver, or also the electrical signal level at the output of the optical receiver is maintained at a constant value. In order to put into practice the first embodiment, additional optical measuring means are needed which, for example, may be coupled to the light guide via an optical splitter. The second embodiment can be designed substantially more advantageously, as it already has a variable which is to be measured electrically.

Furthermore, it is of advantage to provide means for regulating the amplitude of the probe signal in such manner that particularly the degree of modulation or also the signal level at the optical receiver can be regulated to be of constant value. For this, optionally optical or electrical variables may be regulated.

In another embodiment of the invention an additional optical receiver is provided which, for example, is coupled through an optical splitter to the light guide and measures the same signal as that received by the optical receiver. Furthermore, this additional receiver serves exclusively for determining signal levels or degrees of modulation. Thus, this additional receiver may frequently have a narrower bandwidth than the main optical receiver and therefore can be provided at less cost.

An advantageous further development of the invention consists in the light guide having at least two segments, of which one is connected to the optical transmitter and another to the optical receiver. At least one of these segments has an optical medium that can be controlled by signals from the probe in such manner that light from a first segment is cross-coupled into another segment. For example, an arrangement of this kind could therefore be designed in such manner that in a non-operative condition no light is cross-coupled between various segments. In this case no signal reaches the optical receiver. If now, on the other hand, a signal is emitted by the probe, then a cross-coupling between the segments takes place. Therefore a signal is passed on to the receiver for evaluation.

Another embodiment of the invention consists in the optical receiver being designed as a differential receiver. It has means for splitting the signal guided by the light guide into at least one non-modulated and at least one modulated portion. This can be achieved, for example, with phase, polarization, spectral or other filters. Furthermore, the optical receiver is designed so that it compares an non-modulated portion with a modulated portion.

DETAILED DESCRIPTION OF PREFERRED EMBODIMENTS

FIG. 1 schematically shows in a general form a device according to the invention. For the sake of simplicity, a light guide according to the invention is shown to have a linear arrangement. Of course, it may also comprise desired bends, or be bent to form a circle. A light guide 1 is provided at one end with an optical transmitter (2) and at the other end with an optical receiver 3. A probe 4 is disposed to be movable with respect to the light guide. The movement arrow 5 is intended to illustrate this movement along the light guide. Thus, for example, a stationary unit may consist of the light guide 1, the transmitter 2, and the receiver 3, whilst a unit that is movable with respect to it comprises the probe 4. As the motion is only a question of the position of an observer, the functions of the movable and stationary units may be interchanged. The optical transmitter 2 supplies light into the light guide 1. This light is transmitted to the optical receiver 3 through the light guide along the track of the light guide corresponding to the track of movement. This light is now modulated according to the information coupled-in by the probe. For this, the light guide has at least one light-guiding medium which exhibits at least one non-linear optical effect that can be changed by external electromagnetic fields. The fields needed to cause this change are generated by the probe 4. Thus, in a particularly simple case the probe may consist of two or more condenser plates between which the light-guiding medium extends. By an application of an electric voltage together with the modulation signal, the light conveyed in the light-guiding medium can now be modulated in accordance with this signal. Similarly, coils could be provided for generating magnetic fields. For a generation of electromagnetic fields and waves, conductor structures as used in prior art, for example strip conductors, can be mounted in the vicinity of the light-guiding medium. In a case of modulation (changing the transmission characteristics) by light, light sources such as LEDs or laser diodes, for example, can be mounted so that they radiate onto the light-guiding medium. A prerequisite for correct functioning of these probes is, of course, that the light guide be suitably designed so that it will react specifically to the form of the energy emitted by the probe.

In this, the light guidance and the modulation can each be optimized for the respective purpose. Thus, the sections 6 for guiding light can be optimized for an achievement of minimal attenuation and other transmission characteristics such as, for example, dispersion. In the same way, the sections 7 for modulation can be optimized concerning their modulating characteristics. For some purposes a piecewise transmission in which the probe is positioned exactly above a modulation section may be adequate. Now, in order to ensure continuous transmission along the entire transmission distance, the probe should be dimensioned to be sufficiently large, so that it always covers one, but preferably two sections.

In FIG. 3 a side view of a particularly simple embodiment of an optical circuit board or an optical bus system is shown. In this, the light guide 1 is disposed on a support plate 8. An optical transmitter 2 is mounted at one end of the light guide into which it feeds light. An optical receiver 3, mounted at the opposite end of the light guide, is provided to receive the light. In order to change the light guided in the light guide, probes 4a/4b are provided at various positions. Optionally these probes may be assigned to fixed positions, or adapted to be positioned variably. With an arrangement of this kind, bus systems or so-called backplanes may be devised in an advantageous manner, in addition to single circuit boards. Thus, in the last-mentioned case a probe is placed in the vicinity of the light guide to control the signal flow therein and thus transmit information via the bus only upon the insertion of a module or a circuit board. In a particularly advantageous embodiment, an arrangement of this kind can be combined with a configuration according to FIG. 2. In this, the light guide has sections exclusively provided for guiding the light, alternating with sections designed for modulation. The coupling of the probe to this is then effected at respective sections designed for modulation.

Figure 4:
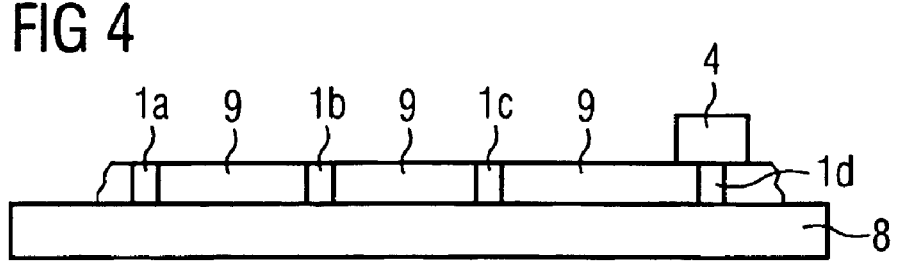
FIG. 4 shows the arrangement of FIG. 3, that has been rotated through 90 degrees.

FIG. 4 shows an arrangement corresponding to FIG. 3, that has been rotated through 90 degrees. Here too, the support plate 8 serves for mechanical accommodation. On this, four light guides 1a, 1b, 1c, and 1d are provided, by way of example. The intermediate spaces between the individual light guides are filled with a filler material. The purpose of this filler material is to achieve a smooth surface, and furthermore to decouple the light guides from each other optically. Of course, embodiments without such filler material are conceivable. Additional optical or electrical conductors may be inserted in the filler material itself, or also placed upon the plane surface thereof. Optical transmitters 2 or optical receivers 3 have been omitted from this illustration for the sake of clarity of presentation. A probe 4 serves to control the light conveyed through the light guide. Particularly with arrangements having a plurality of light guides, it is of advantage to supply a plurality of light guides from one single optical transmitter 2. This may be effected, for example, with suitable couplers of prior art. In accordance with the invention, it is also possible to effect a cross-coupling of light from one light guide into a second light guide by means of a probe, in order to control signal flows.

Figure 5:
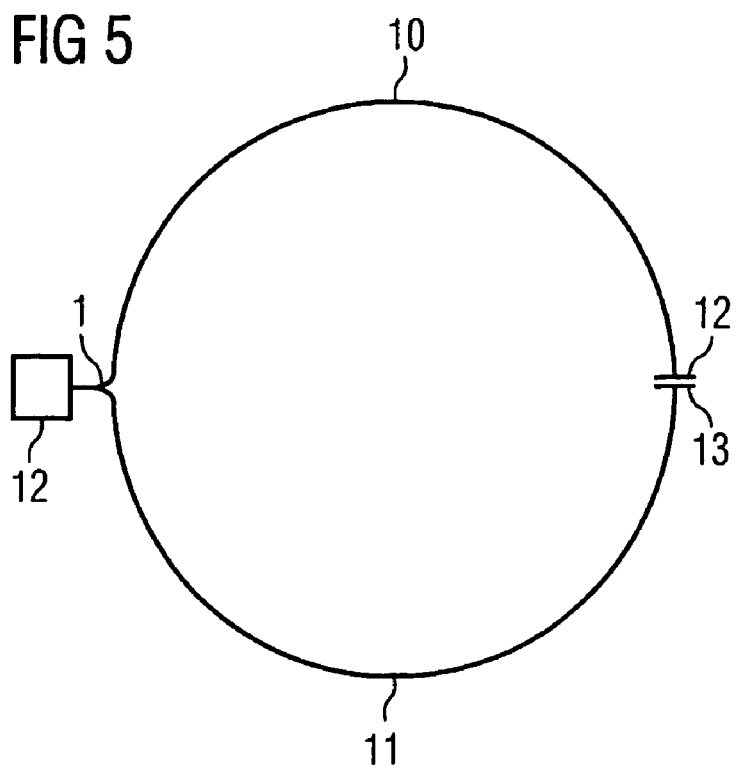
FIG. 5 shows a simple and efficient example of a device according to the invention.

FIG. 5 additionally illustrates a particularly simple and at the same time efficient example of a device according to the invention. Thus, in this the light guide 1 is divided into a first segment 10 and a second segment 11. Both segments are connected in parallel and with a combined transmitting and receiving unit 12 containing both the optical transmitter 2 and the optical receiver 3. Furthermore, both segments are terminated by a first terminal element 13 and a second terminal element 14. These terminal elements optionally may be optical terminals free from reflection, or also mirrors. The kind of termination to be chosen depends on, amongst other factors, the effect used for modulation. If the optical effect itself causes a modulation, then terminations preferably free from reflection should be chosen. In other cases, a signal can be coupled back to the receiver only when the terminations have suitable reflecting properties. An evaluation of the optical signal in the optical transmitting and receiving unit 12 is effected in a known way and manner, however, preferably by a measurement of the phase difference between the first and the second segment. This phase measurement is hardly changed by the movement of the objects, because this, as a rule, is slow in comparison with the modulation frequency.

What is claimed is:

1. A device for transmitting optical signals, comprising:
    a light guide having at least one hollow body or parts of a hollow body with a reflecting inside surface for guiding light by reflection at the inside reflecting surface, or having at least one body of a transparent material, surrounded by at least one medium of a lower refractive index for guiding light by total reflection at a boundary surface between the body of the transparent material and the medium;
    an optical transmitter connected to at least one point of the light guide for feeding optical signals into the light guide;
    an optical receiver connected for receiving optical signals to at least one point of the light guide at which signals from the optical transmitter can be received;
    wherein the light guide comprises at least one light-guiding medium located in an optical path between the transmitter and the receiver, the at least one light-guiding medium exhibiting at least one optical effect that can be changed by external electromagnetic fields or radiation;
    wherein the transmission characteristics of the medium and also of the light guide can be changed by means of the optical effect according to the external electromagnetic fields or radiation;
    wherein at least one probe is disposed at a variable position relative to the optical receiver or optical transmitter along a course of the light guide; and
    wherein the at least one probe is designed to apply to the light guide at least one of electric fields, magnetic fields, electromagnetic fields, or radiation in accordance with information to be transmitted, so that the transmission characteristics of the light guide change in accordance with the information to be transmitted.

2. Device according to claim 1, wherein the light guide comprises at least one light-guiding medium disposed between the transmitter and the receiver, the light-guiding medium exhibiting at least one non-linear optical effect that can be changed by external fields or radiation.

3. Device according to claim 1, wherein the light guide comprises at least one light-guiding medium, the optical properties of which can be changed by at least one of external electric and magnetic fields, and at least one probe is provided that is designed to apply at least one of electric and magnetic fields in accordance with the information to be transmitted, to the light guide.

4. Device according to claim 1, wherein the light guide comprises at least one light-guiding medium, optical properties of which can be changed by external optical radiation, and at least one probe is provided that is designed to apply optical radiation in accordance with the information to be transmitted, to the light guide.

5. Device according to claim 1, wherein the light guide comprises at least one light-guiding medium, optical properties of which can be changed in different ways and manner by different kinds of external electromagnetic fields or radiation, and at least one probe is provided that is designed to apply a plurality of different kinds of electromagnetic fields or radiation in accordance with the information to be transmitted, to the light guide.

6. Device according to claim 5, wherein the light guide comprises at least one light-guiding medium, the optical properties of which can be changed in different ways and manner by electric and also magnetic fields, and at least one probe is provided that is designed to apply electric and also magnetic fields in accordance with the information to be transmitted, to the light guide.

7. Device according to claim 6, wherein the light guide comprises at least one light-guiding medium, the optical properties of which can be changed in different ways and mainner by electric fields and also optical radiation, and at least one probe is provided that is designed to apply electric fields and also optical radiation in accordance with the information to be transmitted, to the light guide.

8. Device according to claim 5, wherein the optical transmitter is designed to emit light at a plurality of given wavelengths simultaneously, the given wavelengths are matched to different kinds of change caused by external electric, magnetic, or electromagnetic fields, and the optical receiver is designed to receive different wavelengths selectively.

9. Device according to claim 5, wherein the optical transmitter is designed to emit light at a plurality of given wavelengths simultaneously, the given wavelengths are matched to different kinds of change caused by external electromagnetic fields, and the optical receiver is designed to receive all different wavelengths at the same time.

10. Device according to claim 1, wherein the light guide comprises sections for guidance of light, and also sections for modulation.

11. Device according to claim 1, wherein the optical transmitter has means for regulating an amplitude of emitted transmitted power in such a manner that optical signal levels at an input of the optical receiver, or electrical signal levels at an output of the optical receiver, have a constant value.

12. Device according to claim 1, wherein means for amplitude regulation are assigned to the probe in such a manner that optical signal levels, or degrees of modulation at an input of the optical receiver, or electrical signal levels, or degrees of modulation at an output of the optical receiver, have a constant value.

13. Device according to claim 11, wherein another optical receiver that determines exclusively signal levels or degrees of modulation is provided for receiving the optical signals.

14. Device according to claim 1, wherein the light guide has at least one first segment and one second segment, at least one first segment being connected to the optical transmitter, and at least one second segment to the optical receiver, and furthermore, at least one of the light guides comprises a medium that can be changed by the probe in such manner that light of a first segment is cross-coupled into a second segment.

15. Device according to claim 1, wherein the optical receiver is designed to be a differential receiver having suitable means for splitting light supplied from the light guide into a modulated and a non-modulated portion, and for evaluating a difference between the two portions.

* * * * *